March 7, 1961  R. D. NORTHCOTE  2,973,727
PULVERISED FUEL BURNER

Filed Feb. 10, 1958  2 Sheets-Sheet 1

INVENTOR
REGINALD DENNIS NORTHCOTE
Strauch, Nolan & Neale
ATTORNEYS

March 7, 1961  R. D. NORTHCOTE  2,973,727
PULVERISED FUEL BURNER
Filed Feb. 10, 1958  2 Sheets-Sheet 2
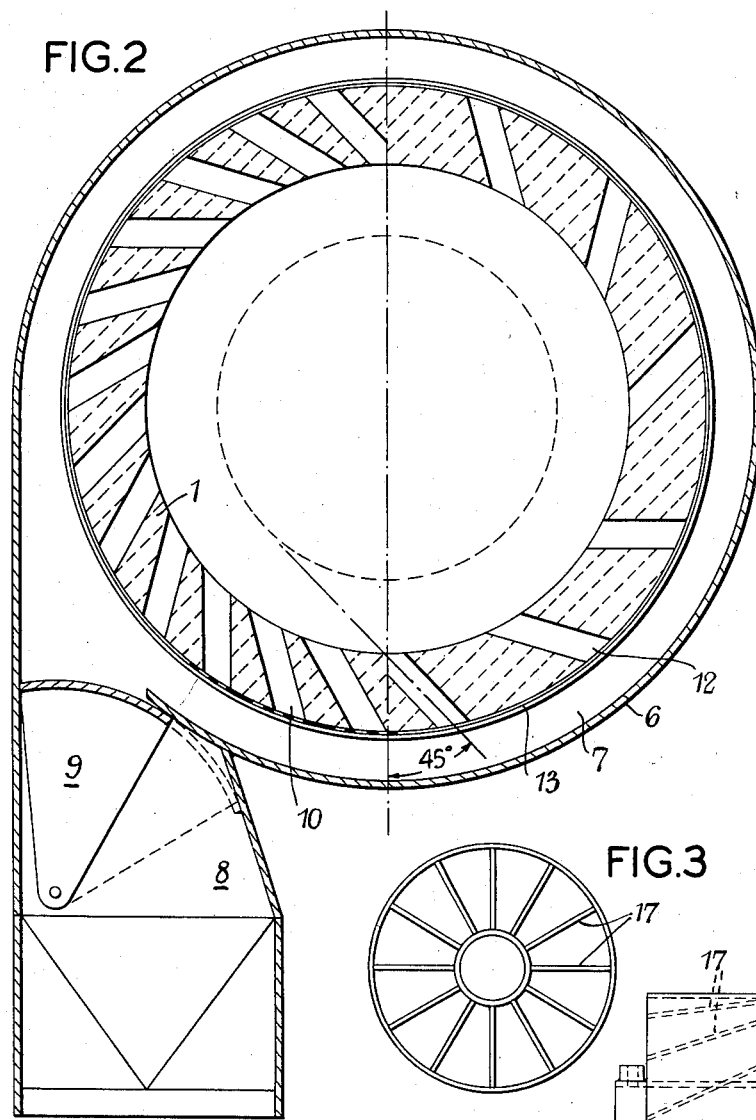
FIG.2
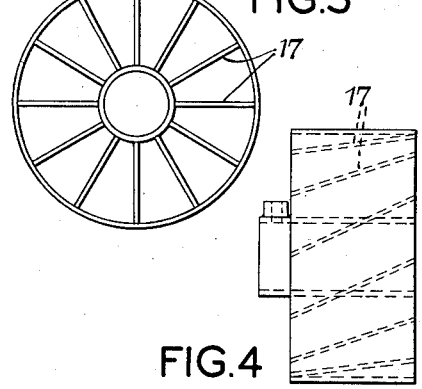
FIG.3
FIG.4
INVENTOR
REGINALD DENNIS NORTHCOTE
Strauch, Nolan + Neale
ATTORNEYS

United States Patent Office 2,973,727
Patented Mar. 7, 1961

2,973,727

PULVERISED FUEL BURNER

Reginald Dennis Northcote, Penn, Wolverhampton, England, assignor to Orr & Sembower Incorporated, Reading, Pa.

Filed Feb. 10, 1958, Ser. No. 714,398

Claims priority, application Great Britain Feb. 22, 1957

1 Claim. (Cl. 110—28)

This invention relates to burners for burning pulverised fuel.

Hitherto in such burners, the whole of the air necessary for complete combustion has been delivered with the fuel, some of the air being used to carry the fuel and the remainder being injected at the ponit at which the fuel enters the combustion chamber. This has had the effect of cooling the flame since most of this air is excess during early stages of combustion and has to be heated. Furthermore the combustion chamber has usually been long or of considerable volume to enable the total combustion of the fuel to be effected.

For certain purposes (such, for example, as the use of pulverised fuel a self contained steam generating unit of fire tube type) it is necessary that the combustion chamber should be limited in dimension and that the fuel should be completely burned rapidly and efficiently. It is an object of the invention to provide a pulverised fuel burner suitable for such purposes.

In the burning of pulverised fuel, three stages can be distinguished although these overlap to some extent. In the first stage, the fuel is heated, ignited and distilled; in the second stage, the volatile matter is burned; and in the third stage the coke resulting from distillation in the first stage is burnt. During the last stage, the particles of coke will be enveloped in inert gas (that is carbon dioxide) and it is necessary to strip this envelope from the particles before the coke can be burnt.

From one aspect, in a burner in accordance with the invention, air necessary for the combustion of the fuel at each stage from original heating to complete combustion is supplied separately at spaced positions along the length of the combustion chamber of the burner.

From another aspect, the invention provides a pulverised fuel burner into which the fuel is introduced into the combustion chamber with sufficient air to ignite and distil the fuel, and further air sufficient to burn the volatile matter and to burn the coke respectively is supplied at points spaced along the combustion chamber.

From yet another aspect, the invention provides a pulverised fuel burner comprising means for introducing fuel into a combustion chamber with a proportion of the air required for complete combustion and in such manner as to cause the fuel to travel in a helical path around the chamber is one direction, and further means to introduce in one or more stages the remainder of the air required for complete combustion in a helical stream opposed to the initial direction of travel of the particles whereby the movement of the particles is reversed and the inert layer surrounding them is removed by the incoming air stream. During such travel centrifugal force promotes a hollow tubular pattern of fuel through the centre of which a proportion of the air and a proportion of the fuel is passed coaxially off the burner.

The air admitted with the fuel, some of which carries the fuel, may comprise 30% to 40% of the total air required for combustion, the remainder of the air being supplied at the subsequent stages. That air which is not dispersed with the fuel cone moves forward coaxially off the burner, carrying a small proportion of the fuel particles and slight excess air which is mixed with any coke particle remaining incompletely burned after the combustion process during the helical motion. The velocity of the air supplied at the subsequent stages may be say twice that of the air initially supplied and in the opposite direction. The inert envelope of gas surrounding each particle is thus subjected to an intense scouring action, stratification of the gases is substantially avoided and the gases intimately mixed.

The combustion chamber is preferably of refractory material and may be surrounded by a jacket into which the air for later injection into the chamber is delivered. This air is thus preheated by transmission of heat from the refractory surface whilst the refractory surface is kept relatively cool.

To adjust the burner to different conditions, for example to suit the output of a boiler fired by it, the quantity of air supplied with the fuel may be kept constant whilst the rate at which fuel is supplied is varied. The quantity of air supplied at subsequent stages is varied similarly to the variation in the supply of fuel and means are provided to maintain the velocity of this air for example by varying the inlet area of ports through which it is supplied. Alternatively both air supplies can be varied as required.

Other parts of the invention are embodied in the preferred form of pulverised fuel burner which will now be described in some detail by way of example with references to the accompanying drawings in which:

Fig. 2 is a section on the line II—II of Fig. 1,

Fig. 3 is an end view of a detail and

Fig. 4 is a side view of the detail shown in Fig. 3.

Figure 1:
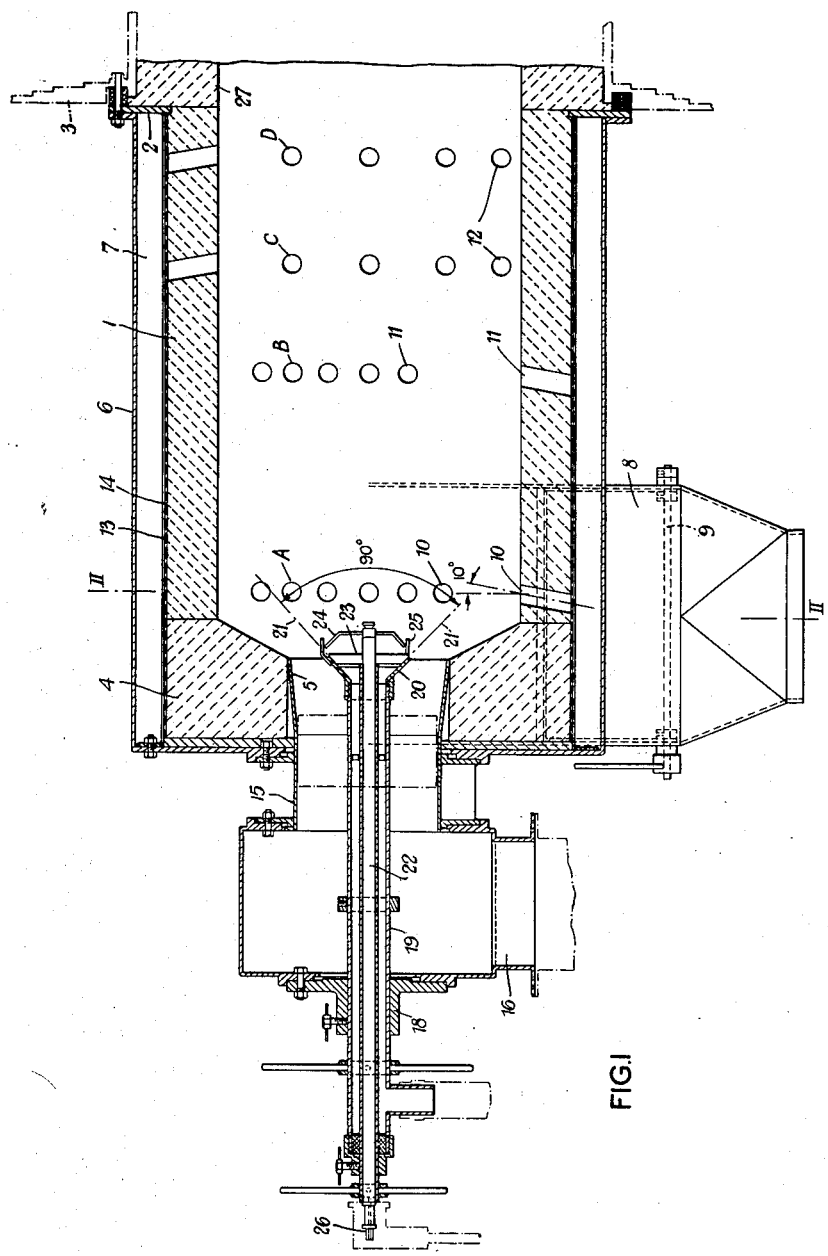
Fig. 1 is a sectional elevation of a burner in accordance with the invention.

This burner will be described in connection with its application to a packaged boiler though it may of course be used with other types of boiler or furnace. It comprises a cylindrical refractory tube 1 forming a combustion chamber adapted for fixture (for example by means of a flanged plate 2 bolted to the end 3 of the boiler), in coaxial alignment with the central combustion tube of a packaged boiler (which being of known construction is not shown). At the other end of this tube 1 is an annular refractory end plate 4 coned on the inner surface and having a central throat 5 tapering outwardly with the largest diameter at the inner surface of the plate.

Enclosing this cylindrical tube 1 is a co-axial metal cylinder 6 spaced from the tube 1 to provide an air space 7 to which air is led through a conduit 8 at one end controlled by a damper 9.

Just forward of the end plate 4 of the refractory tube 1 is a circumferential set A of holes 10 equidistantly spaced around the tube. The axes of these holes lie on the surface of a cone having small base angle (for example 10°) and are inclined to the generatrix of the cone so that air passing through the holes from the surrounding air space to the combustion chamber is given a helical swirling motion towards the combustion tube of the boiler. Looked at in another way, these holes 10, when the refractory tube 1 is viewed from the side of the tube (as in Fig. 1) have their axes inclined forwardly at about 10° and when the tube 1 is viewed in cross-section (as in Fig. 2) the axes of the holes 10 are tangential to a circle (indicated in dotted lines) coaxial with the axis of the tube 1 and of smaller radius than the inner surface of the tube. In cross-section, the axis of each hole 10 may be for example at 45° to the radius of the inner surface of the tube where this intersects the axis of the hole.

The holes 10 are fairly closely spaced around the circumference; in the particular form illustrated there are 24 holes spaced 15° apart.

About midway along the refractory tube 1 there is another set B of circumferential holes 11 similar to the first set A but with their axes inclined in the opposite direction to the generatrices of the cone on which they lie. Air passing through these holes 11 is thus given a swirling helical motion in the opposite sense to that given to the air through the first set but still towards the combustion tube of the boiler. This second set of holes 11 is also closely spaced, for example 24 holes at 15°.

Between this second set B of holes 11 and the end of the combustion tube 1 of the burner there are provided further sets of holes similar and similarly disposed to the second set B. In the form shown there are two such further sets (C, D), each set comprising 12 holes (12) at 30° apart.

Surrounding the refractory tube 1 is a cylindrical band 13 with aperture 14 therein which may be rotated so as to obturate more or less of these holes 10, 11, 12 in order to vary the quantity of air passed through them into the combustion chamber.

A conduit 15 is connected to the end plate 4 of the burner in continuation of the throat 5 and pulverised fuel carried in an air stream is delivered from a supply conduit 16 through this conduit 15 to the combustion chamber. The pulverised fuel is given an initial helical swirling motion by passage through a set of helically arranged vanes 17 in the throat to stratify the fuel at cone edge. These vanes are shown in detail in Figs. 3 and 4.

Passing through a sealing gland 18 in the wall of this conduit and projecting through the throat 5 into the combustion chamber is a gas torch 19 used for ignition of fuel on starting. This torch 19 has an outwardly diverging portion 20 at its end which with the conical shape of the throat 5 causes the air-borne pulverised fuel to enter the combustion chamber in a hollow cone-shape. This hollow cone shape can be altered (as may be necessary when using different fuels or under different operating conditions) by moving the torch 19 longitudinally thereby altering the annular passage between it and the throat 5 through which the fuel passes.

The torch 19 is designed to provide a gas flame of hollow conical shape (indicated at 21) which is more divergent than the hollow cone of fuel so that the gas flame intersects the cone of fuel thereby ensuring efficient ignition thereof. The angle of this hollow gas flame may be altered by moving longitudinally a central rod 22 which carries a plate 23 between the periphery of which and the diverged end 20 of the torch the gas passes.

The gas flame is ignited by means of electric sparks between a spider 24 carried by rod 22 and projections 25 carried by the carry of the torch 19, ignition current being supplied through a conventional spark plug head 26.

In operation, the gas flame is ignited and heats up the refractory lining 1 of the combustion chamber. When this is sufficiently hot, the pulverised fuel is injected into the burner. This may be done automatically under the control of thermostats on the refractory surface operating when the temperature is sufficiently high. The fuel is ignited by the gas flame until such time as conditions ensure that the fuel flame is self-sustaining. The air stream with the fuel is moving in a helical path of short pitch along the combustion chamber and this movement is increased or maintained by the air entering the first set A of holes 10.

At this stage, the air available (comprising that initially carrying the fuel and that supplied through the first set of holes) is about 30% to 40% of that required for complete combustion and has a speed of about 40 to 60 ft./sec. During this stage, the fuel is ignited and distilled so that by the time the second set B of holes 4 is reached, the volatiles have been released and the fuel particles reduced to coke particles.

When the second set B of holes is reached, the further quantity of air admitted is sufficient to allow combustion of the volatiles. The coke particles now encounter at a relative speed of 80 to 120 ft./sec. an air stream moving in the opposite direction and as a result, they are stripped of the envelope of inert gas surrounding them. The air can thus reach the coke particles to burn them. Additional air for this purpose and to complete the combustion enters through the remaining sets C, D of holes, to be joined by air remaining unburned moving coaxially. By the time the fuel reaches the combustion tube of the boiler, it will be completely burnt and the products of combustion will be available for heating water surrounding this tube. It may in some cases be desirable to line the entry of this tube with refractory material 27 but the greater part of its length will be available for heat transfer.

The air admitted through the circumferential sets A to D of holes is preheated in the air space 7 surrounding the refractory cylinder, thereby cooling the cylinder. The motion given to the combustion gases tends to keep them in a hollow cylinder coaxial with the refractory tube 1 and slightly spaced from the inner surface thereof.

The burner 19 may be adjusted to suit the operating conditions of the boiler which it is firing. The primary air (that is the air carrying the fuel to the burner) is kept constant and the rate at which fuel is supplied to this primary air stream is varied by a steam pressure or temperature control modulating the speed of the fuel crusher which supplies the fuel or the opening of a fuel delivery valve or the like. The amount of additional air is varied in accordance with the amount of fuel by varying the position of the damper 9 in the conduit 8 supplying this air, preferably by means controlled by the steam pressure or temperature.

Alteration of the quantity of additional air supplied without alteration of the area of the inlets 10, 11, 12 to the combustion chamber would alter the speed at which this air enters. To avoid this, the number of holes through which the additional air enters is varied by closing or opening some of them by rotation of the band 13 surrounding the refractory tube 1. Such rotation can be effected by linking the band in driving connection to the damper operating handle.

A photo-electric cell may be provided to scan the flame of the burner and to operate means to shut off the supply of fuel should the flame go out.

It will be understood that the invention is not restricted to the details of the preferred form which may be modified without departure from the broad ideas underlying them. For example, other means of controlling the supply of air may be used.

I claim:

A pulverized fuel burner comprising a refractory lined annular combustion chamber, an inlet throat for pulverized fuel, means for delivering fuel through said throat in an airstream only sufficient in amount to permit ignition and distillation of the fuel and in a manner to cause said fuel to travel in a helical path around said chamber, a gas torch having an outwardly diverging end portion, said end portion of said torch defining an annular space with said throat, means to move said end portion of said torch axially of said throat to adjust the angle of the cone in which said fuel enters said combustion chamber, means defining a plurality of openings extending through the wall of said combustion chamber at spaced points around the circumference thereof adjacent the inlet end of said combustion chamber, said openings being tangential to a circle substantially smaller than the wall of said combustion chamber and being inclined toward the outlet end of said combustion chamber, means for delivering air through said openings in quantities sufficient to burn the volatile matter in said fuel, a series of additional circumferentially spaced openings extending through the wall of said combustion chamber, said additional openings also being inclined in a direction toward the outlet end of said combustion chamber and being tangential to a circle smaller than the interior diameter of said combustion chamber and being inclined in a circumferential direction opposite to said first openings, means for supplying air through said additional openings in a helical direction opposite to the direction of the movement of fuel and in quantities sufficient to burn the resulting coke particles, a casing surrounding said combustion chamber, and a band rotatably mounted within said casing, said band having a series of apertures which selectively align with the openings in the combustion chamber wall, said apertures being substantially smaller than the combustion chamber openings whereby when said band is rotated, the openings in said combustion chamber wall are partially obturated to reduce the supply of air therethrough without changing the velocity of the air supplied through said openings.

References Cited in the file of this patent

UNITED STATES PATENTS

| | | |
|---|---|---|
| 1,468,008 | Dyson | Sept. 18, 1923 |
| 1,762,505 | Burg | June 10, 1930 |
| 1,781,236 | Lilge | Nov. 11, 1930 |
| 1,795,347 | Reese | Mar. 10, 1931 |
| 2,284,708 | Woolley | June 2, 1942 |
| 2,800,092 | Burg | July 23, 1957 |

FOREIGN PATENTS

| | | |
|---|---|---|
| 573,515 | Germany | Apr. 1, 1933 |
| 255,080 | Great Britain | Sept. 22, 1927 |
| 302,255 | Great Britain | Dec. 11, 1938 |